United States Patent
Huh et al.

(10) Patent No.: US 8,223,102 B2
(45) Date of Patent: Jul. 17, 2012

(54) THIN FILM TRANSISTOR ARRAY PANEL AND METHOD OF MANUFACTURING THE SAME

(75) Inventors: Chul Huh, Yongin-si (KR); Ki-Hun Jeong, Cheongan-si (KR); Jae-Ho Choi, Seoul (KR); Yang-Ho Jung, Yongin-si (KR); Jin-Seuk Kim, Daejeon (KR); Sang-Hun Lee, Yeongtong-gu (KR); Gwan-Soo Kim, Cheonan-si (KR); Sung-Hoon Yang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 488 days.

(21) Appl. No.: 12/537,702

(22) Filed: Aug. 7, 2009

(65) Prior Publication Data

US 2010/0127961 A1 May 27, 2010

(30) Foreign Application Priority Data

Nov. 21, 2008 (KR) .................... 10-2008-0116216

(51) Int. Cl.
*G09G 3/36* (2006.01)
*G02F 1/1339* (2006.01)

(52) U.S. Cl. ............. 345/92; 345/87; 349/155; 349/156
(58) Field of Classification Search .................. 345/87, 345/92; 349/156, 155
See application file for complete search history.

(56) References Cited

U.S. PATENT DOCUMENTS

| 7,738,059 | B2 * | 6/2010 | Kim ............................... 349/110 |
| 2007/0012919 | A1 * | 1/2007 | Oh et al. ............................... 257/59 |
| 2007/0194307 | A1 * | 8/2007 | Kim et al. ............................... 257/40 |
| 2009/0153033 | A1 * | 6/2009 | Lee et al. ............................... 313/504 |

* cited by examiner

*Primary Examiner* — Kevin M Nguyen
(74) *Attorney, Agent, or Firm* — F. Chau & Associates, LLC

(57) ABSTRACT

A thin film transistor array panel including a substrate, gate lines and data lines formed on the substrate, and thin film transistors each with a control terminal, an input terminal, and an output terminal. The control and input terminals of the thin film transistor are connected to the gate and data lines. A barrier rib is formed on the gate lines, the data lines, and the thin film transistors. The output terminal of the thin film transistor has an opening, and a portion of the barrier rib formed on the output terminal has an output opening. The barrier rib output terminal portion has the same pattern as the output terminal. A barrier rib for forming contact holes is formed through exposing an organic layer formed on a passivation layer to light from the backside of a substrate using drain electrodes with openings as a light blocking film.

20 Claims, 14 Drawing Sheets

THIN FILM TRANSISTOR ARRAY PANEL AND METHOD OF MANUFACTURING THE SAME

CROSS-REFERENCE TO RELATED APPLICATION

This application claims priority to and the benefit of Korean Patent Application No. 10-2008-0116216 filed in the Korean Intellectual Property Office on Nov. 21, 2008, the entire contents of which are incorporated herein by reference.

BACKGROUND OF THE INVENTION (a) Technical Field

The present invention relates to a thin film transistor array panel, and a method of manufacturing the same.

(b) Discussion of the Related Art

Liquid crystal displays are widely used flat panel displays. A liquid crystal display may have two display panels on which field generating electrodes such as pixel electrodes and common electrodes are formed, and a liquid crystal layer interposed between the panels. In the liquid crystal display, voltages are applied to the field generating electrodes so as to generate an electric field over the liquid crystal layer, and then the alignment of liquid crystal molecules of the liquid crystal layer is determined by the electric field. Accordingly, the polarization of incident light is controlled, thereby performing image display.

The liquid crystal display may further include color filters expressing colors by using light that passes through the liquid crystal layer. The color filters may be provided on the common electrode panel.

As the color filters commonly contain colors of red, green, and blue, respectively, the two display panels should be properly aligned with each other when being assembled such that pixels face the corresponding colors, respectively. However, considering an alignment error of the two display panels, a light blocking member between the pixels may be widened so that pixel openings are decreased in size. As a result, the aperture ratio is reduced.

In order to prevent reduction of the aperture ratio, it has been suggested that the color filters be formed on the thin film transistor array panel, or the color filters be formed through inkjet printing. If the color filters are formed through inkjet printing, it is not necessary to use a light exposure device, and hence the process of forming the color filters is simplified.

However, with the above process, as the color filter covers a drain electrode, a contact hole should be formed at an overcoat covering the color filter and a passivation layer in order to connect a pixel electrode to the drain electrode, and this involves complicated processing steps and potentially poor etching uniformity.

SUMMARY OF THE INVENTION

Embodiments of the present invention provide a thin film transistor array panel and a manufacturing method thereof minimizing the size of contact holes and simplifying processing steps.

A thin film transistor array panel, according to an embodiment of the present invention, includes a substrate, gate lines formed on the substrate and extending in a first direction, data lines formed on the substrate and extending in a second direction, wherein the date lines cross and are insulated from the gate lines, and thin film transistors each with a control terminal, an input terminal, and an output terminal. The control and input terminals of the thin film transistor are connected to the gate and data lines. A barrier rib is formed on the gate lines, the data lines, and the thin film transistors with the same pattern as the gate lines, the data lines, and the thin film transistors. Color filters fill regions demarcated by the barrier rib. Pixel electrodes are formed on the color filters. The output terminal of the thin film transistor has an opening, and a portion of the barrier rib formed on the output terminal has an output opening. The barrier rib output terminal portion has the same pattern as the output terminal.

A pixel electrode may partially contact a lateral side of the opening of the output terminal and the barrier rib output terminal portion.

The thin film transistor array panel may further include a passivation layer formed between the data lines and the barrier rib and color filters, and an overcoat formed between the barrier rib and color filters and the pixel electrodes. The passivation layer and the overcoat include contact holes, and the pixel electrode contacts the output terminal of the thin film transistor through the contact holes of the passivation layer and the overcoat.

The pixel electrode may contact the substrate through the output opening of the output terminal.

The contact hole of the passivation layer may be smaller in diameter than the contact hole of the overcoat, and the output opening of the barrier rib output terminal portion may be larger in diameter than the contact hole of the passivation layer but smaller in diameter than the contact hole of the overcoat.

The barrier rib output terminal portion may have a line width of about 2 μm to about 4 μm.

Furthermore, a light blocking member may be formed on the overcoat corresponding to the barrier rib.

The barrier rib may be formed through exposing a positive photosensitive organic material to light.

A gate line opening may be formed at the end portion of the gate line to expose the substrate, and a data line opening may be formed at the end portion of the data line to expose the substrate.

The thin film transistor array panel may further include a gate line barrier rib portion formed on the end portion of the gate line with the same pattern as the end portion of the gate line with the gate line opening, and a data line barrier rib portion formed on the end portion of the data line with the same pattern as the end portion of the data line with the data line opening.

A method of manufacturing a thin film transistor array panel, according to an exemplary embodiment of the present invention, includes forming gate lines extending in a first direction on a substrate, forming a gate insulating layer on the gate lines, forming semiconductors on the gate insulating layer, forming data lines extending in a second direction crossing the first direction, and forming drain electrodes with openings. After the formation of the data lines and the drain electrodes, a passivation layer and a positive photosensitive organic layer are sequentially formed on the data lines and the drain electrodes. The positive photosensitive organic layer is exposed to light from the backside of the substrate by using the gate lines, the data lines, and the drain electrodes as a light blocking film to thereby form a barrier rib. Color filters are formed within the regions demarcated by the barrier rib through inkjet printing. The barrier rib has a drain electrode barrier rib portion formed on a drain electrode with an opening.

The method may further include forming an overcoat on the color filters and the barrier rib with a photosensitive material, exposing a portion of the overcoat surrounded by the drain electrode barrier rib portion to light from the front side of the substrate and developing the light-exposed portion to thereby form a contact hole, removing a portion of the passivation layer and the gate insulating layer corresponding to the contact hole to thereby expose the drain electrode with the opening, and forming a pixel electrode such that the pixel electrode is connected to the drain electrode through the contact hole.

The method may further include forming a light blocking member on the barrier rib.

A thin film transistor array panel, according to an embodiment of the present invention, includes a substrate, gate lines formed on the substrate and extending in a first direction, data lines formed on the substrate and extending in a second direction, wherein the data lines cross and are insulated from the gate lines, and thin film transistors each with a control terminal, an input terminal, and an output terminal with an opening. The control and input terminals of the thin film transistor are connected to the gate and data lines. A barrier rib is formed on the data lines. Color filters fill regions demarcated by the barrier rib, and have contact holes exposing the output terminals of the thin film transistors. Pixel electrodes are formed on the color filters such that the pixel electrodes contact the output terminals through the contact holes. The barrier rib is absent from the output terminals.

The color filters may be formed by exposing a negative photosensitive material to light, and the contact holes may be formed by conducting photolithography by using the output terminals as a light blocking film such that the contact holes are similar in shape to the output terminals.

The output terminal of the thin film transistor may be polygonal-shaped with a plurality of sides, and a portion of the output terminal overlapping the color filter at the center of the respective sides thereof may have a line width of about 3 μm or less. The sides of the output terminal overlapping the color filter may differ in line width from each other by about 0.5 μm or less.

A method of manufacturing a thin film transistor array panel, according to an exemplary embodiment of the present invention, includes forming gate lines on a substrate extending in a first direction, forming a gate insulating layer on the gate lines, forming semiconductors on the gate insulating layer, forming drain electrodes and data lines extending in a second direction crossing the first direction, forming a passivation layer on the data lines and the drain electrodes, forming a barrier rib on the passivation layer corresponding to the gate and data lines, forming color filters within regions demarcated by the barrier rib through inkjet printing, and exposing the color filters to light from the backside of the substrate by using the drain electrodes as a light blocking film, thereby forming openings at the color filters such that the passivation layer is exposed through the openings.

The color filters may be formed by exposing a negative photosensitive material to light.

The method may further include forming an overcoat on the color filters, patterning the overcoat with the same pattern as the contact holes, and forming pixel electrodes on the overcoat such that they are connected to the drain electrodes through the contact holes.

With a thin film transistor array panel according to an exemplary embodiment of the present invention, a barrier rib for forming contact holes is formed through exposing a positive photosensitive organic layer formed on the passivation layer to light from the backside of a substrate by using drain electrodes with openings as a light blocking film, thereby minimizing the size thereof.

Furthermore, the overcoat formed within the barrier rib to make contact holes may be removed only through light-exposing and developing without conducting separate dry-etching, thereby simplifying the process of forming the contact holes.

The color filters are formed with a negative photosensitive organic material, and are exposed to light from the backside of a substrate by using the drain electrodes as a light blocking film, thereby minimizing the size of the contact holes.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified without departing from the spirit or scope of the present invention.

Figure 1:
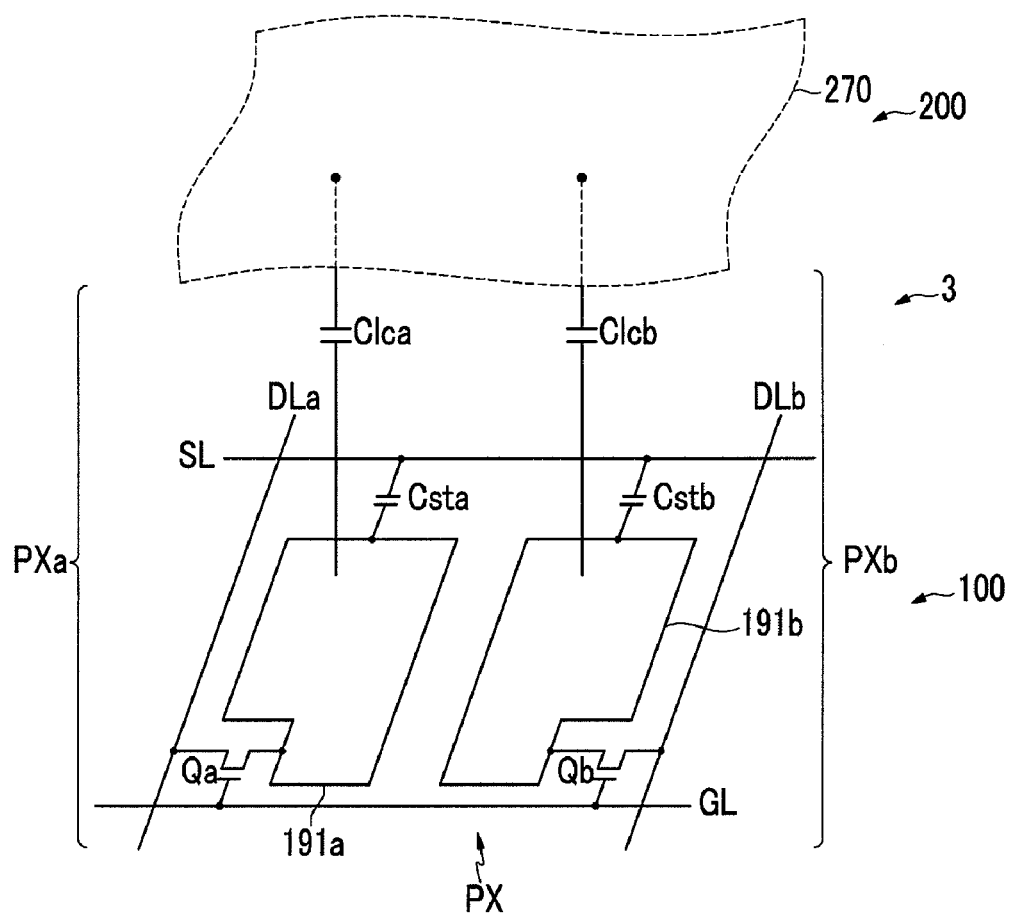
FIG. 1 is an equivalent circuit diagram of a pixel of a liquid crystal display according to an exemplary embodiment of the present invention.

In the drawings, the thickness of layers, films, panels, regions, etc., are exaggerated for clarity. Like reference numerals may designate like elements throughout the specification. It will be understood that when an element such as a layer, film, region, or substrate is referred to as being "on" another element, it can be directly on the other element or intervening elements may also be present. FIG. 1 is an equivalent circuit diagram of a pixel of a liquid crystal display according to an exemplary embodiment of the present invention.

Referring to FIG. 1, a liquid crystal display according to an exemplary embodiment of the present invention includes signal lines including a plurality of gate lines (GL), a plurality of pairs of data lines DLa and DLb, and a plurality of storage electrode lines SL, and a plurality of pixels PX connected to the signal lines. The liquid crystal display includes lower and upper display panels 100 and 200, and a liquid crystal layer 3 interposed between the two panels 100 and 200.

The respective pixels PX include a pair of sub-pixels PXa and PXb, which in turn include switching elements Qa and Qb, liquid crystal capacitors Clca and Clcb, and storage capacitors Csta and Cstb, respectively.

The switching elements Qa and Qb are each a three-terminal element, such as a thin film transistor, formed on the lower display panel 100. The control terminals of the switching elements Qa and Qb are connected to the gate line GL, the input terminals thereof are respectively connected to the data lines DLa and DLb, while the output terminals thereof are respectively connected to the liquid crystal capacitors Clca and Clcb and the storage capacitors Csta and Cstb.

The liquid crystal capacitors Clca and Clcb respectively include sub-pixel electrodes 191a and 191b and a common electrode 270 as two terminals, and the liquid crystal layer 3 interposed between the two terminals as a dielectric.

The storage capacitors Csta and Cstb, which assist the liquid crystal capacitors Clca and Clcb, are formed by overlapping the storage electrode line SL with the sub-pixel electrodes 191a and 191b and interposing an insulator between the storage electrode line SL and the sub-pixel electrodes 191a and 191b. A predetermined voltage, such as a common voltage Vcom, is applied to the storage electrode line SL.

Voltages charged at the two liquid crystal capacitors Clca and Clcb are slightly differ from each other. For example, the data voltage applied to one of the liquid crystal capacitors Clca is lower or higher than the data voltage applied to the other liquid crystal capacitor Clcb. When the voltages of the two liquid crystal capacitors Clca and Clcb are appropriately controlled, an image viewed from the lateral side maximally approximates an image viewed from the frontal side, thereby improving the lateral visibility of images displayed by the liquid crystal display.

Figure 2:
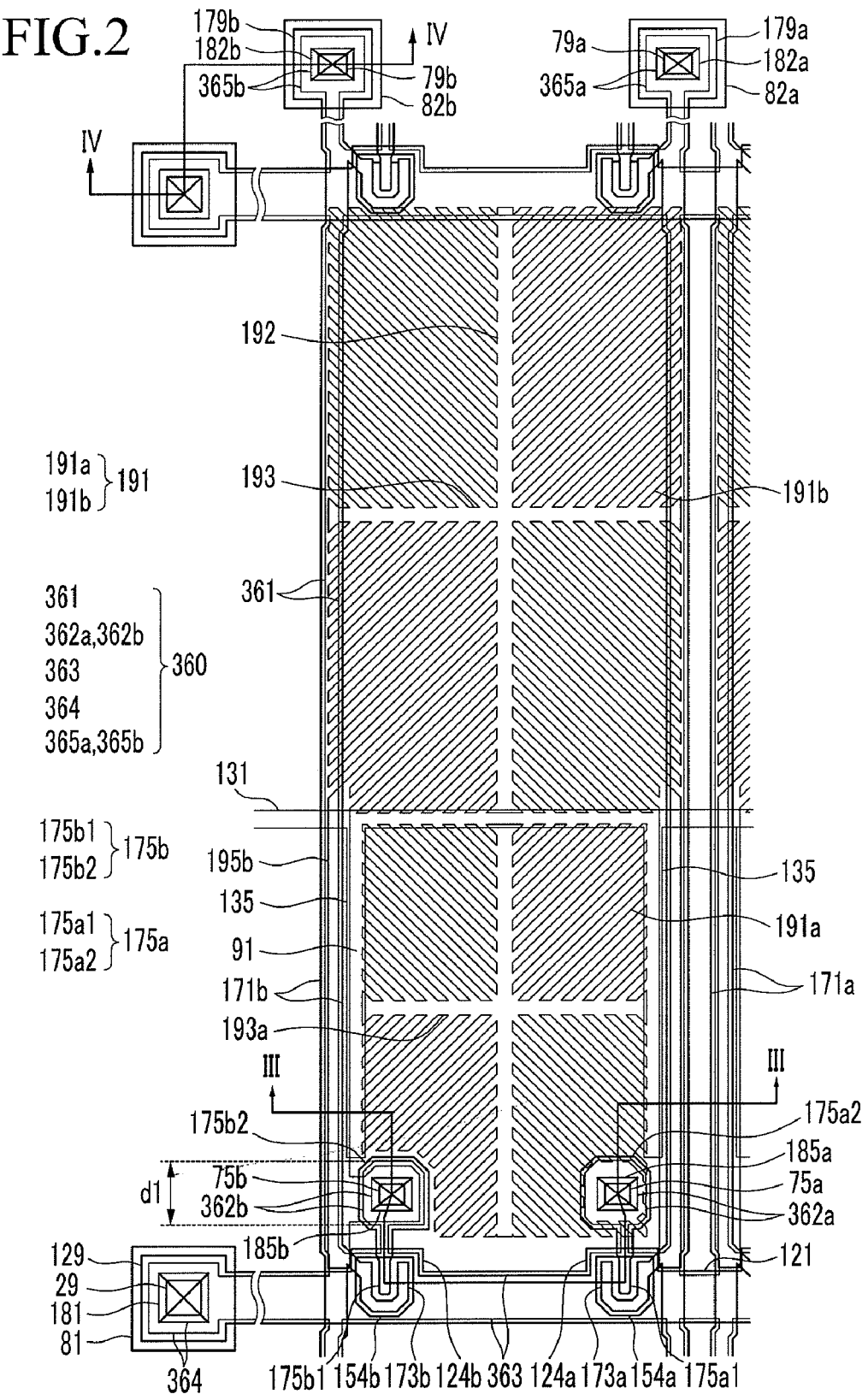
FIG. 2 is a layout view of a thin film transistor array panel according to an exemplary embodiment of the present invention.
Figure 3:
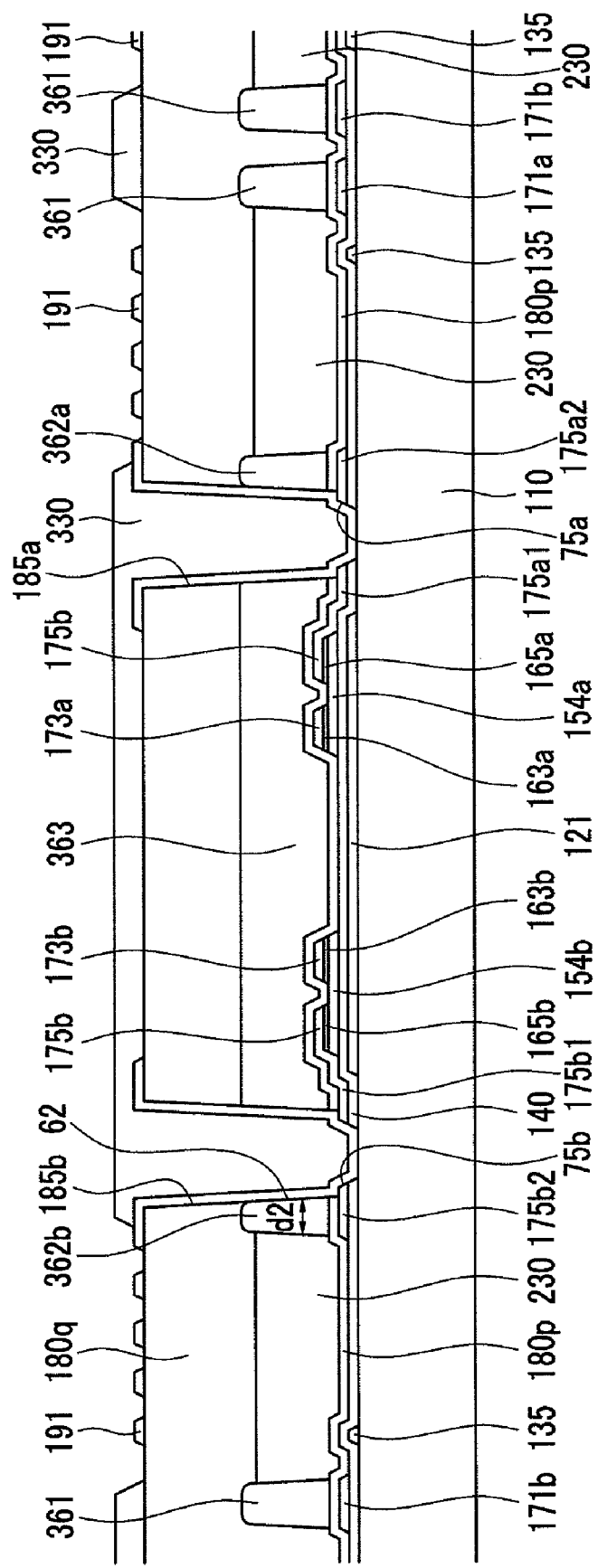
FIG. 3 is a cross-sectional view of the thin film transistor array panel taken along the III-III line of FIG. 2.
Figure 4:
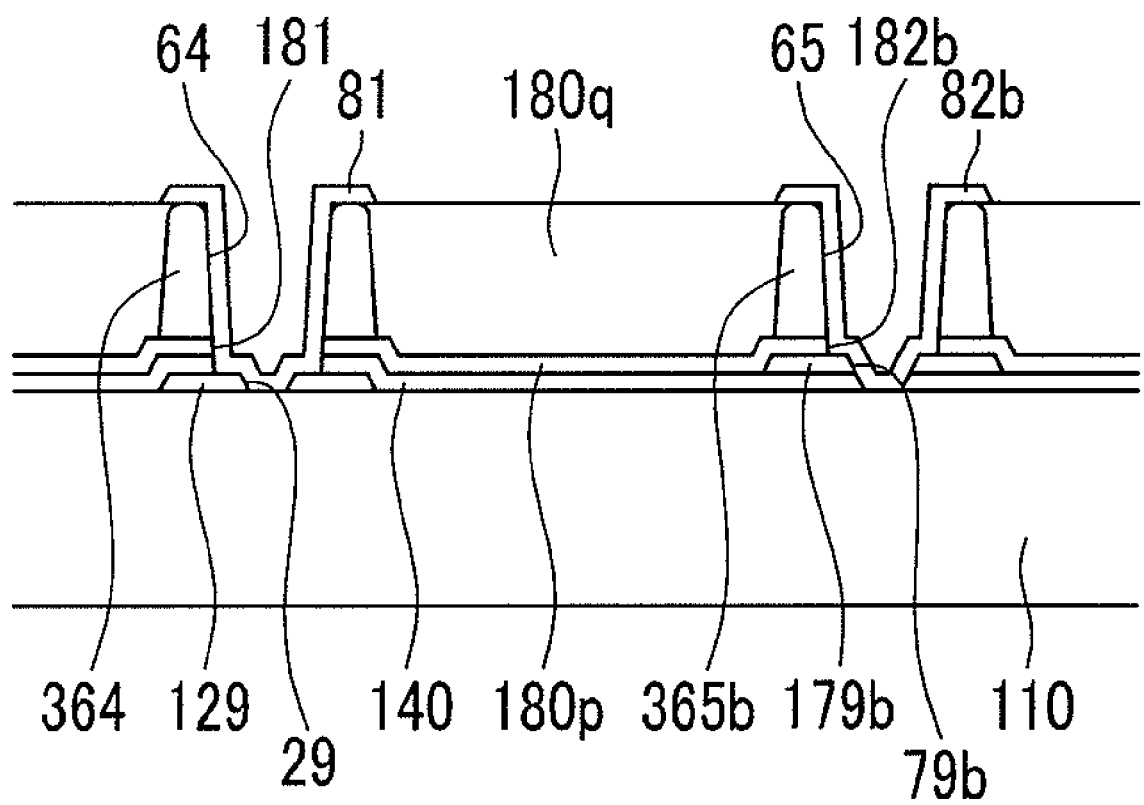
FIG. 4 is a cross-sectional view of the thin film transistor array panel taken along the IV-IV line of FIG. 2.

FIG. 2 is a layout view of a thin film transistor array panel according to an exemplary embodiment of the present invention, and FIG. 3 and FIG. 4 are cross-sectional views of the thin film transistor array panel taken along the III-III line and the IV-IV line of FIG. 2.

A thin film transistor array panel according to an exemplary embodiment of the present invention includes an insulation substrate 110, including, for example, transparent glass, and gate lines 121 and storage electrode lines, including stems 131 and storage electrodes 135, formed on the insulation substrate 110.

The gate lines 121 extend in the horizontal direction and transmit gate signals. The gate lines 121 each have a plurality of protrusions forming gate electrodes 124a and 124b, and a wide end portion 129 to be connected with other layers or external driving circuits. A gate line opening 29 is formed at the wide end portion 129 of the gate line 121 so as to expose the insulation substrate 110. The gate line opening 29 is formed at the center of the wide end portion 129 of the gate line 121, and the wide end portion 129 of the gate line 121 is donut-shaped or rectangular-shaped with a central opening formed by the gate line opening 29.

The storage electrode lines, including stems 131 and storage electrodes 135 are positioned between two neighboring gate lines 121. The stems 131 extend in the horizontal direction parallel to the gate lines 121. A predetermined voltage such as the common voltage Vcom that is applied to the common electrode is applied to the storage electrode lines. The storage electrode lines include stems 131 extended substantially parallel to the gate lines 121, and a plurality of storage electrodes 135 protruded from the stems 131. The shape and disposition of the storage electrode lines may be altered in various manners.

The gate lines 121 and the storage electrode lines, including the stems 131 and storage electrodes 135, may have multi-layered structures with two conductive layers (not shown) that differ in physical properties from each other. A gate insulating layer 140 is formed on the gate lines 121 and the storage electrode lines. The gate insulating layer 140 may include silicon nitride (SiNx).

A plurality of semiconductors 154a and 154b are formed on the gate insulating layer 140 with hydrogenated amorphous silicon (abbreviated simply as a-Si) or polysilicon.

A plurality of pairs of ohmic contacts 163a, 165a, and 163b, 165b are formed on the semiconductors 154a and 154b, respectively. The ohmic contacts 163a, 163b, 165a, and 165b may be formed of n+ hydrogenated amorphous silicon where n-type impurities are doped at a high concentration, or of silicide.

A plurality of pairs of first and second source electrodes 173a and 173b, and a plurality of pairs of first and second drain electrodes 175a and 175b are formed on the ohmic contacts 163a, 163b, 165a, and 165b and the gate insulating layer 140.

The data lines 171a and 171b transmit data signals, and extend roughly or substantially in the vertical direction such that they cross the gate lines 121 and the stems 131 of the storage electrode lines. The data lines 171a and 171b include the first and second source electrodes 173a and 173b bent toward the first and second gate electrode 124a and 124b in the shape of a capital letter U, and wide end portions 179a and 179b to be connected with other layers or external driving circuits. The first and second source electrodes 173a and 173b face the first and second drain electrodes 175a and 175b around the first and second gate electrodes 124a and 124b.

The first and second drain electrodes 175a and 175b have wide end portions 175a2 and 175b2 connected to the sub-pixel electrodes 191a and 191b, and bar-shaped end portions 175a1 and 175b1. The bar-shaped end portions 175a1 and 175b1 of the first and second drain electrodes 175a and 175b are surrounded by the first and second U-shaped source electrodes 173a and 173b. However, the shape and disposition of the data lines 171a and 171b including the first and second source electrodes 173a and 173b may be altered.

First and second drain electrode openings 75a and 75b are formed at the wide end portions 175a2 and 175b2 of the first and second drain electrodes 175a and 175b and expose the insulation substrate 110. The first and second drain electrode openings 75a and 75b are formed at the centers of the wide end portions 175a2 and 175b2 of the first and second drain electrodes 175a and 175b. The wide end portions 175a2 and 175b2 of the first and second drain electrodes 175a and 175b are donut-shaped or rectangular-shaped each with a central opening formed by the first and second drain electrode openings 75a and 75b. Data line openings 79a and 79b are formed at the wide end portions 179a and 179b of the data lines 171a and 171b and expose the insulation substrate 110. The data line openings 79a and 79b are disposed at the centers of the wide end portions 179a and 179b of the data lines 171a and 171b. The wide end portions 179a and 179b of the data lines 171a and 171b are donut-shaped or rectangular-shaped each with a central opening formed by the data line openings 79a and 79b.

The first and second gate electrodes 124a and 124b, the first and second source electrodes 173a and 173b, and the first and second drain electrodes 175a and 175b form first and second thin film transistors (TFT) Qa and Qb together with the first and second semiconductors 154a and 154b. The channels of the first and second thin film transistors Qa and Qb are formed at the first and second semiconductors 154a and 154b between the first and second source electrodes 173a and 173b and the first and second drain electrodes 175a and 175b.

The ohmic contacts 163a, 163b, 165a, and 165b exist between the underlying semiconductors 154a and 154b and the overlying source electrodes 173a and 173b and drain electrodes 175a and 175b and lower the contact resistance therebetween. The semiconductors 154a and 154b have exposed portions not covered by the source electrodes 173a and 173b and the drain electrodes 175a and 175b, including the portions thereof between the source electrodes 173a and 173b and the drain electrodes 175a and 175b.

The data lines 171a and 171b including the source electrodes 173a and 173b and the drain electrodes 175a and 175b may have a multi-layered structure including a refractory metal layer (not shown) and a low resistance conductive layer (not shown).

A passivation layer 180p, including, for example, silicon nitride or silicon oxide, is formed on the data lines 171a and 171b including the source electrodes 173a and 173b, the drain electrodes 175a and 175b, and the exposed portions of the semiconductors 154a and 154b.

A barrier rib 360 is formed on the passivation layer 180p. The barrier rib 360 includes a first barrier rib portion 361 formed along the data lines 171a and 171b, second barrier rib portions 362a and 362b formed with the same pattern as the end portions 175a2 and 175b2 of the first and the second drain electrodes 175a and 175b with the first and second drain electrode openings 75a and 75b, a third barrier rib portion 363 formed along the gate line 121 and the thin film transistor, a fourth barrier rib portion 364 formed with the same pattern as the end portion 129 of the gate line 121 with the gate line opening 29, and fifth barrier rib portions 365a and 365b formed with the same pattern as the end portions 179a and 179b of the data lines 171a and 171b with the data line openings 79a and 79b.

A region surrounded by the first and third barrier rib portions 361 and 363 is filled with a material of a color filter 230, and is roughly or substantially rectangular-shaped. The second barrier rib portions 362a and 362b have openings 62 surrounding the first and second drain electrode openings 75a and 75b, the fourth barrier rib portion 364 has an opening 64 surrounding the gate line opening 29, and the fifth barrier rib portions 365a and 365b have openings 65 surrounding the data line openings 79a and 79b. The region surrounded by the second barrier rib portions 362a and 362b, the fourth barrier rib portion 364, and the fifth barrier rib portions 365a and 365b, that is, the region of the openings 62, 64, and 65, is not filled with the material of the color filter 230, and may be formed in various shapes such as a circle and a quadrangle. The barrier rib 360 may be formed with a positive photosensitive organic material.

Referring to FIG. 2 and FIG. 3, the color filter 230 may be formed by injecting a liquid color filter material (referred to hereinafter as ink) into the target space through inkjet printing. As the second barrier rib portions 362a and 362b are formed at the area of contact holes 185a and 185b through which the drain electrodes 175a and 175b contact the pixel electrode, the ink is prevented from flowing into the contact hole area such that the color filter 230 does not cover the area of the contact holes 185a and 185b.

An overcoat 180q is formed on the color filter 230. The overcoat 180q is also present on the barrier rib 360 to form a flattened surface. The overcoat 180p prevents the pigment of the color filter 230 from flowing into the exposed portions of the semiconductors 154a and 154b. The overcoat 180q may be formed with a photosensitive organic material.

The plurality of contact holes 185a and 185b are formed at the overcoat 180q and the passivation layer 180p and partially expose the first and second drain electrodes 175a and 175b. The contact holes 185a and 185b coincide with the inner boundaries of the second barrier rib portions 362a and 362b, and the sides of the opening 62. Contact holes 181 are formed at the overcoat 180q, the passivation layer 180p, and the gate insulating layer 140 so as to expose the end portions 129 of the gate lines 121. The contact hole 181 coincides with the inner boundary of the fourth barrier rib 364, and the sides of the opening 64. A plurality of contact holes 182a and 182b are formed at the overcoat 180q and the passivation layer 180p and expose the end portions 179a and 179b of the data lines 171a and 171b. The contact holes 182a and 182b respectively coincide with the inner boundaries of the fifth barrier rib portions 365a and 365b, and the sides of the opening 65.

A plurality of pixel electrodes 191 and contact assistants 81, 82a, and 82b are formed on the overcoat 180q. The pixel electrodes 191 and the contact assistants 81, 82a, and 82b may be formed with a transparent conductive material such as ITO and IZO, or with a reflective material such as aluminum, silver, and alloys thereof. The respective pixel electrodes 191 include first and second sub-pixel electrodes 191a and 191b that are separated from each other by a gap 91. The first and second sub-pixel electrodes 191a and 191b each have one or more basic electrodes such as a basic electrode 199 shown in FIG. 5 or variants thereof. The first and second sub-pixel electrodes 191a and 191b contact the end portions 175a2 and 175b2 of the first and second drain electrodes 175a and 175b through the contact holes 185a and 185b. The first and second sub-pixel electrodes 191a and 191b contact the sides of the openings 62 of the second barrier rib portions 362a and 362b. The first and second sub-pixel electrodes 191a and 191b contact the sides of the first and second drain electrode openings 75a and 75b of the first and second drain electrodes 175a and 175b, and the first and second sub-pixel electrodes 191a and 191b contact the substrate 110 through the first and second drain electrode openings 75a and 75b.

The entrances of the contact holes 185a and 185b are wider than the interiors thereof. Accordingly, the portions of the contact holes 185a and 185b formed at the passivation layer 180p are smaller (e.g., having a smaller diameter) than the portions of the contact holes 185a and 185b formed at the overcoat 180q, and the openings 62 of the second barrier rib portions 362a and 362b are larger (e.g., having a larger diameter) than the portions of the contact holes 185a and 185b formed at the passivation layer 180p, but smaller (e.g., having a smaller diameter) than the portions of the contact holes 185a and 185b formed at the overcoat 180q. The line width d2 of the second barrier rib portions 362a and 362b may be about 2 μm to about 4 μm. If the line width d2 of the second barrier rib portions 362a and 362b is less than about 2 μm, the second barrier rib portions 362a and 362b are liable to be damaged due to the pressure of ink. By contrast, if the line width d2 of the second barrier rib portions 362a and 362b exceeds about 4 μm, the space filled with the ink is reduced and the openings 62 of the second barrier rib portions 362a and 362b are accordingly narrowed so that the pixel electrode 191 may not contact the first and second drain electrodes 175a and 175b.

The basic electrode 199 will now be described in further detail with reference to FIG. 5.

Figure 5:
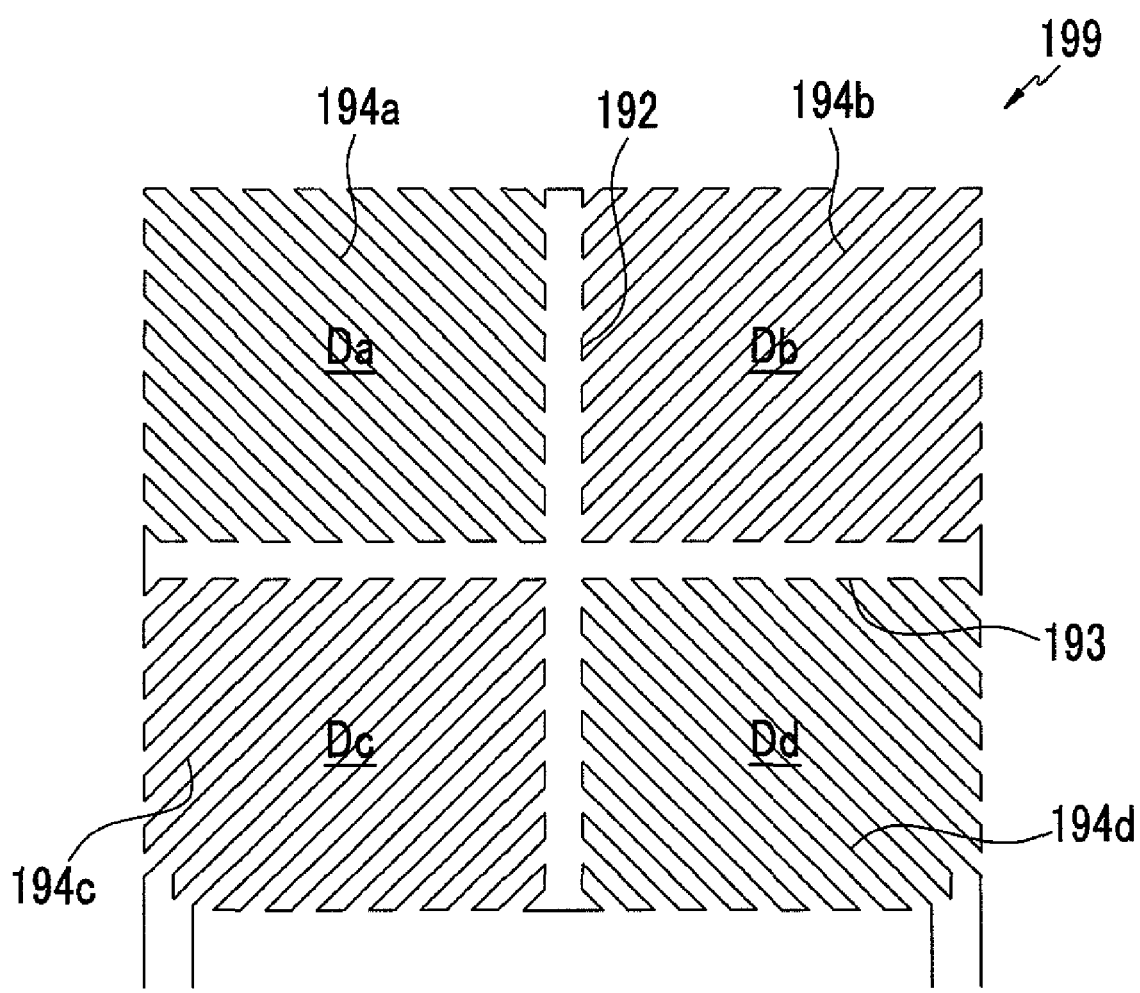
FIG. 5 is a top plan view of a basic electrode for pixel electrodes according to an exemplary embodiment of the present invention.

As shown in FIG. 5, the basic electrode 199 is quadrangular-shaped, and has a cross-shaped stem portion with horizontal and vertical stems 193 and 192 extending perpendicular to each other. Furthermore, the basic electrode 199 is partitioned into first to fourth sub-regions Da, Db, Dc, and Dd by the horizontal and vertical stems 193 and 192, and the sub-regions Da to Dd include a plurality of first to fourth mini-branches 194a, 194b, 194c, and 194d, respectively.

The first mini-branches 194a extend at oblique angles from the horizontal stem 193 or the vertical stem 192 toward the top left, and the second mini-branches 194b extend at oblique angles from the horizontal stem 193 or the vertical stem 192 toward the top right. The third mini-branches 194c extend at oblique angles from the horizontal stem 193 or the vertical stem 192 toward the bottom left, and the fourth mini-branches 194d extend at oblique angles from the horizontal stem 193 or the vertical stem 192 toward the bottom right. The first to fourth mini-branches 194a to 194d are angled with respect to the gate line 121 or the horizontal stem 193 by about 45 or about 135 degrees. Furthermore, the mini-branches 194a to 194d of neighboring sub-regions, for example, Da and Db, Da and Dc, Db and Dd, and Dc and Dd, may extend perpendicular to each other. Although not shown in the drawing, the widths of the mini-branches 194a to 194d may be enlarged when coming closer to the horizontal stem 193 or the vertical stem 192. Referring to FIG. 2 to FIG. 5, the first and second sub-pixel electrodes 191a and 191b each include one basic electrode 199. However, the area of the second sub-pixel electrode 191b may be larger than the area of the first sub-pixel electrode 191a, and in this case, the second sub-pixel electrode 191b has a different sized basic electrode 199 such that the area thereof is larger than the area of the first sub-pixel electrode 191a by about 1.0 to about 2.2 times.

The sides of the mini-branches 194a to 194d deform the electric field generated in the liquid crystal layer 3 by the first and second sub-pixel electrodes 191a and 191b receiving the data voltage and the common electrode 270 receiving the common voltage so as to form horizontal field components proceeding perpendicular to the sides of the mini-branches 194a to 194d. The inclination direction of the liquid crystal molecules 310 is determined by the horizontal field components. Accordingly, liquid crystal molecules of the liquid crystal layer 3 are initially disposed to be inclined in the direction perpendicular to the sides of the mini-branches 194a to 194d. However, as the horizontal field components based on the sides of neighboring mini-branches 194a to 194d are opposite to each other and the distance between the neighboring mini-branches 194a to 194d is short, the inclined liquid crystal molecules 310 are parallel to the longitudinal direction of the neighboring mini-branches 194a to 194d. Conventionally, if the liquid crystal molecules are not initially pre-tilted in the longitudinal direction of the mini-branches 194a to 194d, the liquid crystal molecules would be inclined in the longitudinal direction of the mini-branches 194a to 194d by two steps. However, with the present exemplary embodiment, as the liquid crystal molecules are already pre-tilted in the direction parallel to the longitudinal direction of the neighboring mini-branches 194a to 194d, the liquid crystal molecules are inclined in a direction parallel to the longitudinal direction of the mini-branches 194a to 194d by only one step. In this way, when the liquid crystal molecules are pre-tilted, they are inclined in the target direction by one step so that the response time of the liquid crystal display can be enhanced.

Furthermore, with an exemplary embodiment of the present invention, as the mini-branches 194a to 194d of one pixel PX have four longitudinal directions, the liquid crystal molecules are inclined also in four directions. In this way, as the liquid crystal molecules have varied inclination directions, the reference viewing angle of the liquid crystal display is widened.

The first and second sub-pixel electrodes 191a and 191b are physico-electrically connected to the first and second drain electrodes 175a and 175b through the contact holes 185a and 185b and receive data voltages from the first and second drain electrodes 175a and 175b.

The first and second sub-pixel electrodes 191a and 191b receive separate voltages from the different data lines 171a and 171b, and the voltage received by the first sub-pixel electrode 191a with a relatively small area is higher than the voltage received by the second sub-pixel electrode 191b with a relatively large area.

In this way, when the first and second sub-pixel electrodes 191a and 191b differ in voltage from each other, the liquid crystal capacitor Clca formed between the first sub-pixel electrode 191a and the common electrode 270 and the liquid crystal capacitor Clcb formed between the second sub-pixel electrode 191b and the common electrode 270 involve different voltages so that the liquid crystal molecules at the respective sub-pixels PXa and PXb differ in inclination angle from each other, and accordingly, the two sub-pixels PXa and PXb have different luminances from each other. Therefore, when the voltages of the liquid crystal capacitors Clca and Clcb are properly controlled, the image viewed from the lateral side maximally approximates the image viewed from the frontal side, that is, the lateral gamma curve maximally approximates the frontal gamma curve. In this way, the lateral visibility can be enhanced.

A light blocking member 330 is formed on the overcoat 180q corresponding to the gate lines 121, the data lines 171a and 171b including the first and second source electrodes 173a and 175b, and the first and second drain electrodes 175a and 175b. The light blocking member 330 is also present on the overcoat 180q corresponding to the barrier rib 360.

FIG. 6 to FIG. 11 are cross-sectional views sequentially illustrating a method of manufacturing the thin film transistor array panel shown in FIG. 2 to FIG. 4.

Figure 6:
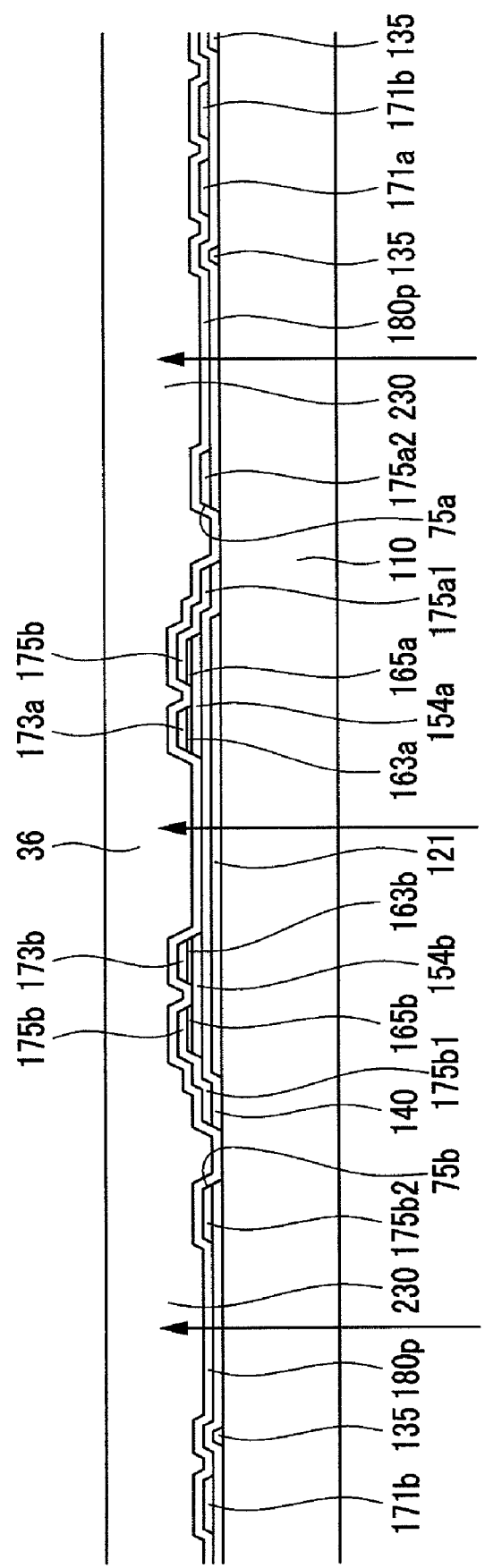
FIG. 6 to FIG. 11 are cross-sectional views illustrating a method of manufacturing the thin film transistor array panel shown in FIG. 2 to FIG. 4.
Figure 7:
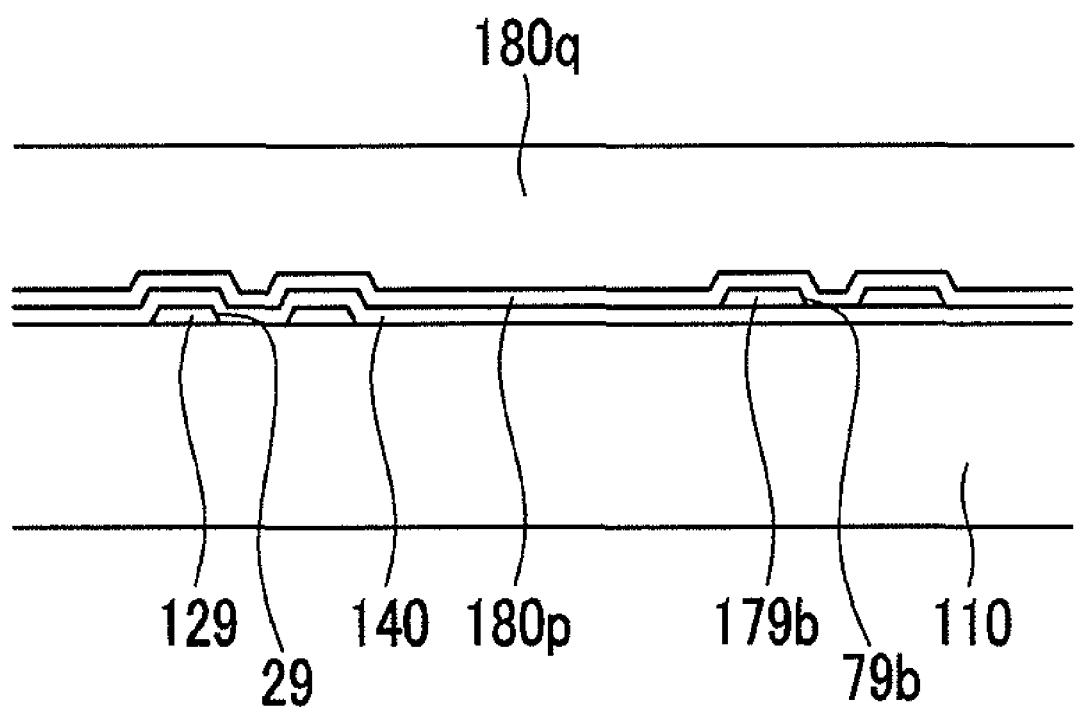

First, as shown in FIG. 6 and FIG. 7, a metal layer including, for example, aluminum-neodymium (AlNd) or molybdenum (Mo) is deposited onto an insulation substrate 110, and etched through photolithography, thereby forming gate lines 121 each including gate electrodes 124a and 124b and an end portion 129, and storage electrode lines, including stem portions 131 and storage electrodes 135. At this time, a gate line opening 29 is formed at the end portion 129 of the gate line 121 so as to expose the insulation substrate 110. A silicon oxide layer is deposited onto the gate lines 121 and the storage electrode lines to form a gate insulating layer 140. A non-doped amorphous silicon layer and an amorphous silicon layer doped with impurities are sequentially deposited onto the gate insulating layer 140, and patterned to thereby form an ohmic contact pattern and semiconductors 154a and 154b. Thereafter, a conductive layer is deposited onto the ohmic contact pattern, and is patterned to form data lines 171a and 171b with source electrodes 173a and 173b, and drain electrodes 175a and 175b. At this time, first and second drain electrode openings 75a and 75b are formed at wide end portions 175a2 and 175b2 of the first and second drain electrodes 175a and 175b so as to expose the gate insulating layer 140, and data line openings 79a and 79b are formed at the end portions 179a and 179b of the data lines 171a and 171b so as to expose the gate insulating layer 140. The ohmic contact pattern exposed through the source electrodes 173a and 173b and the drain electrodes 175a and 175b is etched using the source electrodes 173a and 173b and the drain electrodes 175a and 175b as a mask to thereby form ohmic contacts 163a, 163b, 165a, and 165b. The semiconductors 154a and 154b, the ohmic contacts 163a, 163b, 165a, and 165b, the data lines 171a and 171b, and the drain electrodes 175a and 175b may each be formed separately by using a mask, or formed together by using a photoresist pattern that is differentiated in thickness with a slit mask. The ohmic contacts 163a, 163b, 165a, and 165b have the same plane pattern as the data lines 171a and 171b including the source electrodes 173a and 173b, and the drain electrodes 175a and 175b. A passivation layer 180p is formed on the data lines 171a and 171b including the source electrodes 173a and 173b, and the drain electrodes 175a and 175b. A positive photosensitive organic insulating layer 36 is formed on the passivation layer 180p. The organic insulating layer 36 is exposed to light from the backside of the substrate 110 by using the gate lines 121, the data lines 171a and 171b, and the drain electrodes 175a and 175b as a light blocking film.

Figure 8:
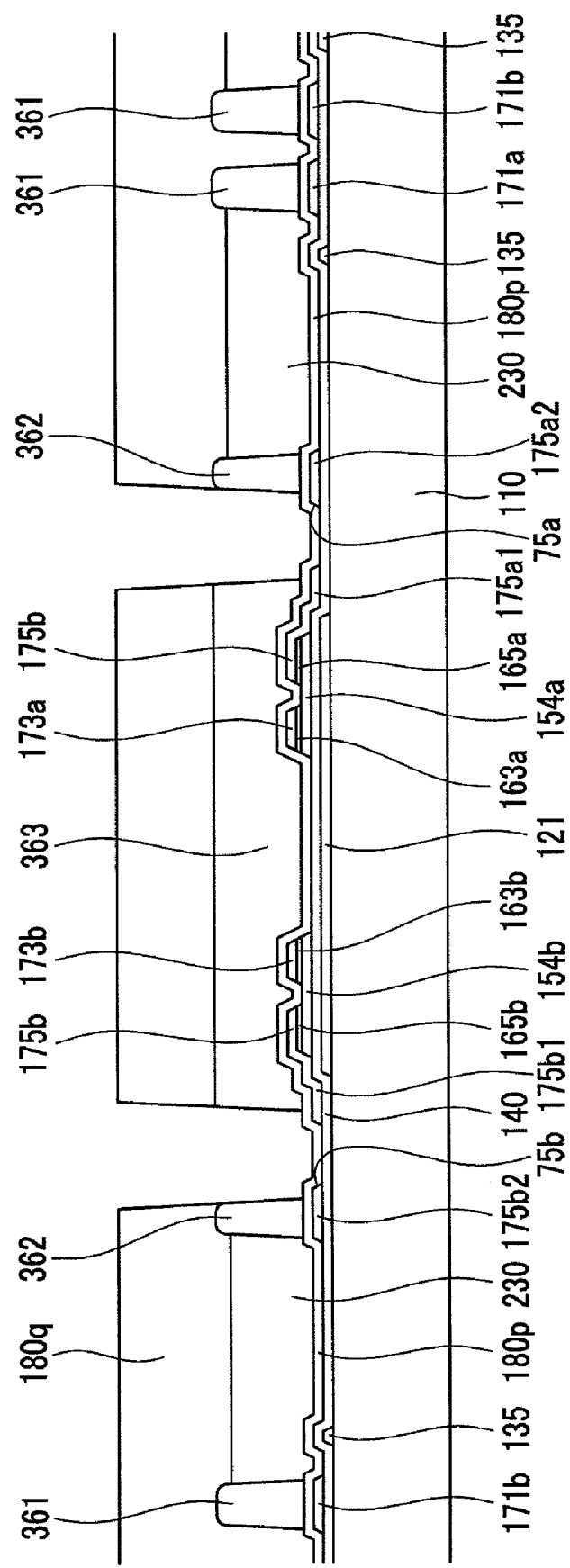
Figure 9:
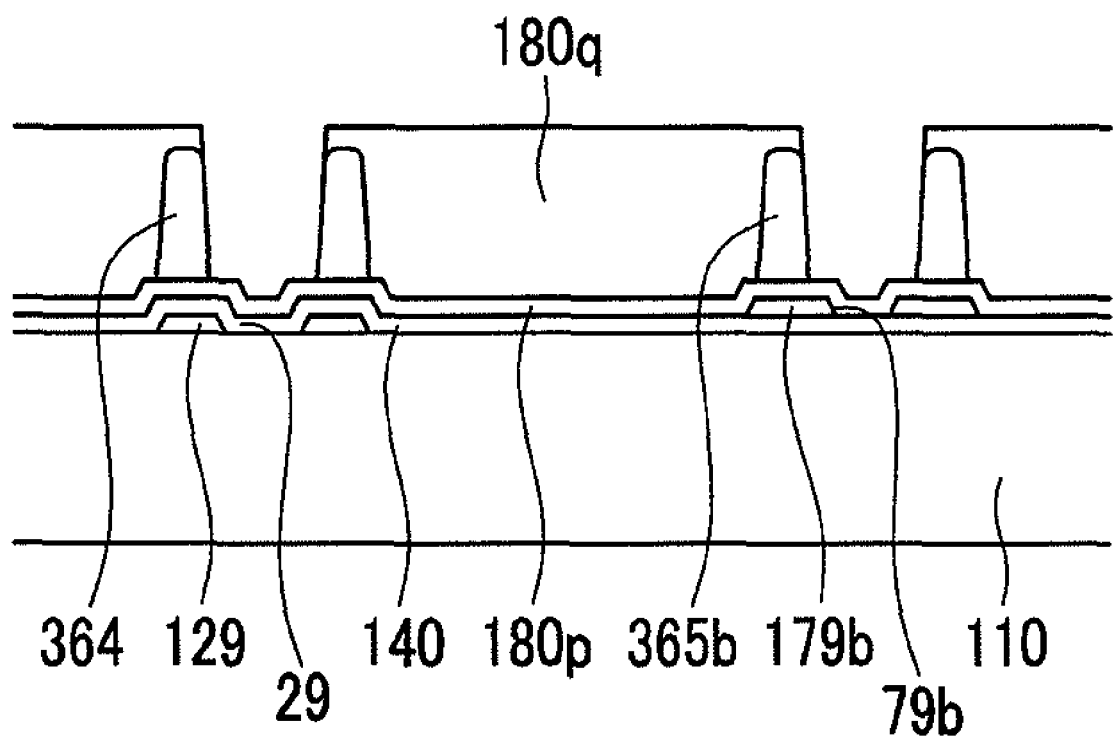

Thereafter, as shown in FIG. 8 and FIG. 9, the light-exposed organic insulating layer 36 is developed such that the organic insulating layer 36 formed on the gate lines 121, the data lines 171a and 171b, and the drain electrodes 175a and 175b becomes a barrier rib 360. The barrier rib 360 includes a first barrier rib portion 361 formed along the data lines 171a and 171b, second barrier rib portions 362a and 362b formed with the same pattern as the end portions 175a2 and 175b2 of the first and the second drain electrodes 175a and 175b with the first and second drain electrode openings 75a and 75b, a third barrier rib portion 363 formed along the gate line and the thin film transistor, a fourth barrier rib portion 364 formed with the same pattern as the end portion 129 of the gate line 121 with the gate line opening 29, and fifth barrier rib portions 365a and 365b formed with the same pattern as the end portions 179a and 179b of the data lines 171a and 171b with the data line openings 79a and 79b. If the photosensitive organic insulating layer 36 is exposed to light using a backside light exposing device with no optical filter, it is difficult to form minute patterns because a backside light exposing device with no optical filter has poor resolution. However, if the data lines 171a and 171b have a line width of about 3 µm, the barrier rib 360 may have a height of about 3.5 µm that is sufficiently high to prevent overflowing of a material for color filters 230.

Color filters 230 are formed within the pixels defined by the first and third barrier ribs 361 and 363. The color filter 230 is not formed at the end portions 175a2 and 175b2 of the first and second drain electrodes 175a and 175b surrounded by the second barrier rib portions 362a and 362b. This is because the second barrier rib portions 362a and 362b prevent the color filter material 230 from flowing into the end portions 175a2 and 175b2 of the first and second drain electrodes 175a and 175b. The color filter 230 may be formed by way of the inkjet printing process, which is conducted by dripping a color filter solution onto a target while moving an inkjet head, and drying the color filter solution. An overcoat 180q is formed on the color filter 230 with a photosensitive organic material, and flattened. The overcoat 180q may be formed through inkjet printing, as with the color filter 230. The overcoat 180q is also formed at the region surrounded by the second barrier rib portions 362a and 362b. The portions of the overcoat 180q surrounded by the second barrier rib portions 362a and 362b are exposed to light from the front side of the substrate 110, and are removed through developing to thereby form contact holes 185a and 185b at the overcoat 180q.

Conventionally, when the color filter 230 is etched through photolithography by using a patterned overcoat as a light blocking film in order to form contact holes 185a and 185b, the thick color filter 230 increases the processing time so that the overcoat that functions as a light blocking film is damaged. Furthermore, as the respective different-colored color filters 230 have different etching rates, remnants are liable to be made, particularly with the formation of a green color filter where copper is added as a pigment. However, with the present exemplary embodiment, as the overcoat 180q formed within the second barrier rib portions 362a and 362b is formed with a photosensitive organic material, the overcoat 180q in the second barrier rib portions 362a and 362b may be removed only through light-exposing and developing without conducting a separate dry etching step, thereby simplifying the process of forming the contact holes 185a and 185b.

Figure 10:
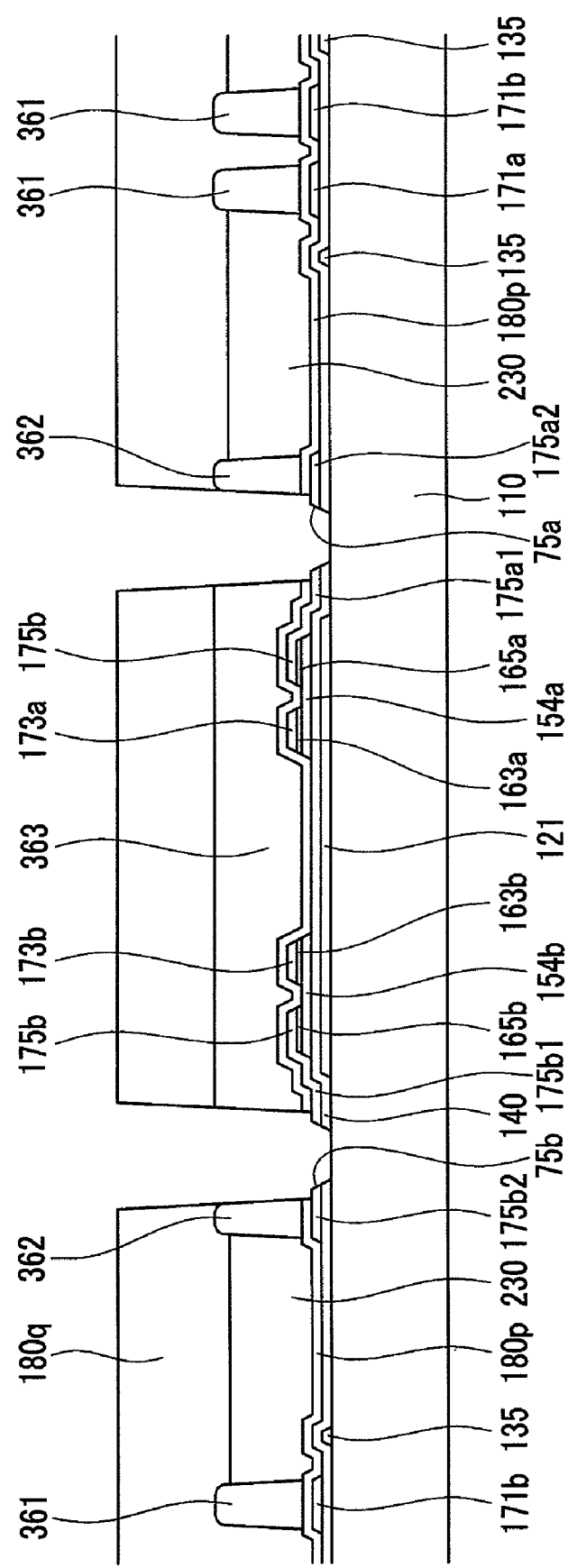
Figure 11:
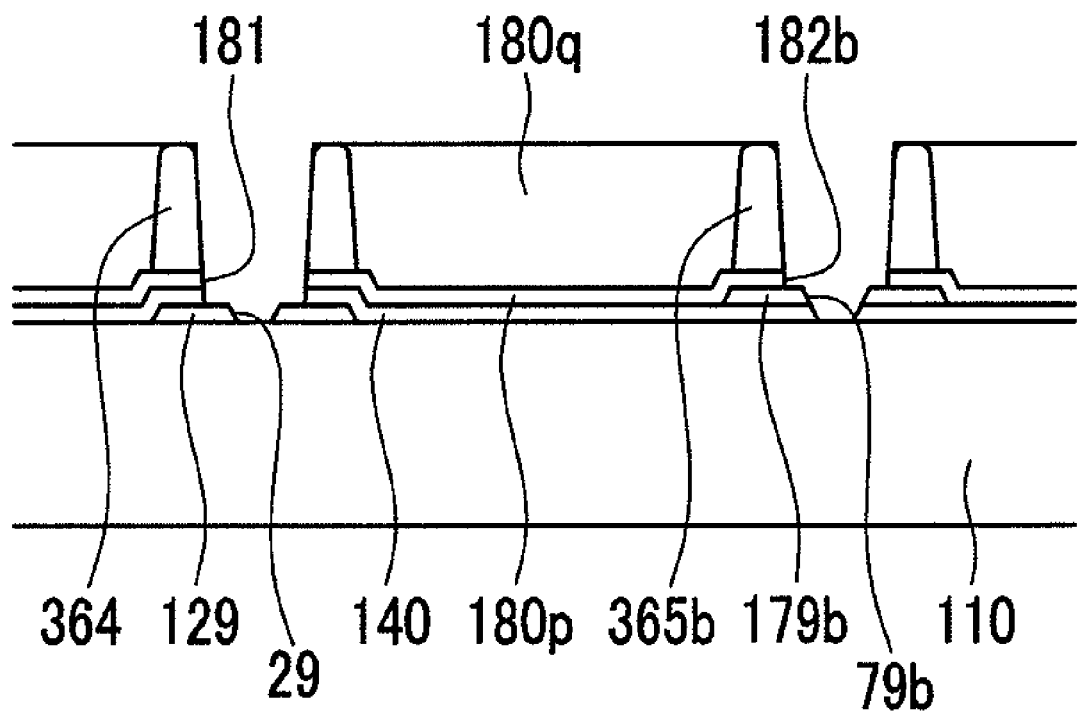

Then, as shown in FIG. 10 and FIG. 11, the portions of the passivation layer 180p and the gate insulating layer 140 corresponding to the contact holes 185a and 185b are dry-etched to thereby expose the first and second drain electrodes 175a and 175b with the first and second drain electrode openings 75a and 75b. Dry etching is performed under the conditions of organic layer etching and physical anisotropic etching with the addition of oxygen gas. Accordingly, as the overcoat 180q, the second barrier rib portions 362a and 362b, and the passivation layer 180p are etched together under the organic layer etching condition, the inner boundaries of the contact holes 185a and 185b formed at the overcoat 180q, the second barrier rib portions 362a and 362b, and the passivation layer 180p have substantially the same plane pattern and coincide with each other. Therefore, the passivation layer 180p under the second barrier rib portions 362a and 362b is prevented from being over-etched. Furthermore, the gate insulating layer 140 under the first and second drain electrodes 175a and 175b is prevented from being over-etched due to the physical anisotropic etching conditions.

Thereafter, as shown in FIG. 2 to FIG. 4, a pixel electrode 191 is formed on the overcoat 180q such that it is connected to the first and second drain electrodes 175a and 175b through the contact holes 185a and 185b.

The positive photosensitive organic layer formed on the passivation layer 180p is exposed to light from the backside thereof by using the first and second drain electrodes 175a and 175b with the first and second drain electrode openings 75a and 75b as a light blocking film so that the second barrier rib portions 362a and 362b can be easily formed to prevent the color filter material 230 from flowing into end portions 175a2 and 175b2 of the first and second drain electrodes 175a and 175b.

Furthermore, the positive photosensitive organic layer formed on the passivation layer 180p is exposed to light from the backside thereof by using the first and second drain electrodes 175a and 175b with the first and second drain electrode openings 75a and 75b as a light blocking film to thereby form second barrier rib portions 362a and 362b, and contact holes 185a and 185b are formed by using the second barrier rib portions 362a and 362b as a reference, thereby minimizing the size of the contact holes 185a and 185b. If the second barrier rib portions 362a and 362b are formed through conducting the photolithography process by using a separate mask, the size of the second barrier rib portions 362a and 362b approaches about 42 µm. By contrast, with the present exemplary embodiment, when the photolithography process is based on the backside light exposure, the size d1 of the second barrier rib portions 362a and 362b, as shown in FIG. 2, may be reduced to about 12 µm. If the second barrier rib portions are formed through conducting photolithography by using a separate mask, it is necessary to provide a separate light blocking film. By contrast, with the present exemplary embodiment, when the backside light exposure is performed, the first and second drain electrodes 175a and 175b function as a mask so that a separate light blocking film is not required, and the manufacturing process is simplified.

Furthermore, with the present exemplary embodiment, when the second barrier rib portions 362a and 362b are formed through backside light exposure, the first and second drain electrodes 175a and 175b function as a light blocking film, and hence the distance between the second barrier rib portions 362a and 362b and the first and second drain electrodes 175a and 175b is relatively short so that the desired alignment can be facilitated. If a separate mask pattern is used, diffraction occurs at the edge of the mask pattern, but with the present embodiment, such diffraction does not occur so that minute and rigid patterns may be formed.

Figure 12:
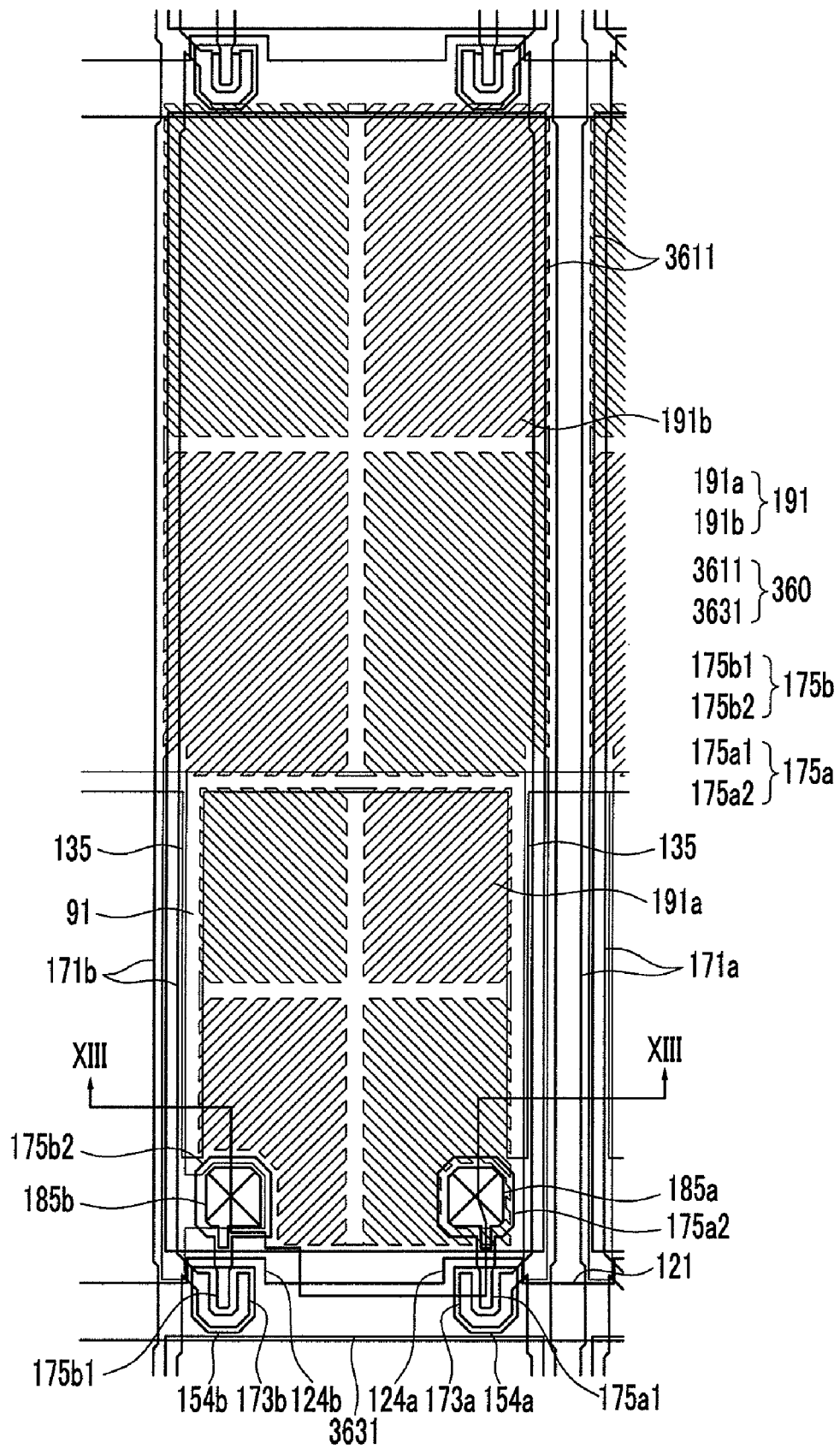
FIG. 12 is a layout view of a thin film transistor array panel according to an exemplary embodiment of the present invention.
Figure 13:
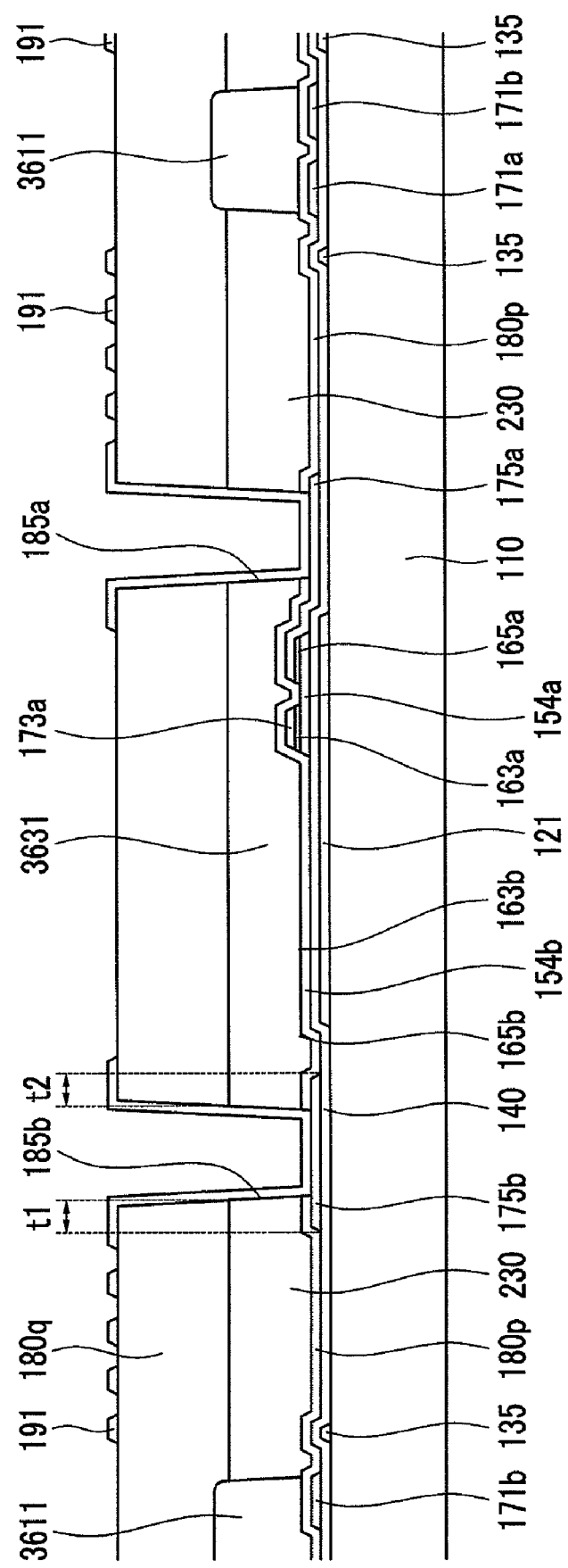
FIG. 13 is a cross-sectional view of the thin film transistor array panel taken along the XIII-XIII line of FIG. 12.

FIG. 12 and FIG. 13 illustrate a thin film transistor array panel according to an exemplary embodiment of the present invention where the contact holes are reduced in size by using the backside light exposure technique.

FIG. 12 is a layout view of a thin film transistor array panel according to an exemplary embodiment of the present invention, and FIG. 13 is a cross-sectional view of the thin film transistor array panel taken along the XIII-XIII line of FIG. 12.

A thin film transistor array panel according to an exemplary embodiment of the present invention includes an insulation substrate 110, and gate lines 121 and storage electrode lines, including stem portions 131 and storage electrodes 135 formed on the insulation substrate 110. Each gate line 121 has a plurality of protrusions forming gate electrodes 124a and 124b, and a wide end portion 129. A plurality of semiconductors 154a and 154b are formed on the gate insulating layer 140, and a plurality of pairs of ohmic contacts 163a, 165a, and 163b, 165b are formed on the semiconductors 154a and 154b, respectively. A plurality of pairs of source electrodes 173a and 175b and a plurality of pairs of first and second drain electrodes 175a and 175b are formed on the ohmic contacts 163a, 163b, 165a, and 165b and the gate insulating layer 140. The data lines 171a and 171b include first and second source electrodes 173a and 173b extended and U-shaped toward the first and second gate electrodes 124a and 124b, and wide end portions 179a and 179b to be connected with other layers or external driving circuits. The first and second source electrodes 173a and 173b face the first and second drain electrodes 175a and 175b with respect to the first and second gate electrodes 124a and 124b. The first and second drain electrodes 175a and 175b have wide end portions 175a2 and 175b2 connected to the sub-pixel electrodes 191a and 191b, and bar-shaped end portions 175a1 and 175b1. The wide end portions 175a2 and 175b2 of the first and second drain electrodes 175a and 175b are polygonal-shaped with a plurality of sides, and the bar-shaped end portions 175a1 and 175b1 of the first and second drain electrodes 175a and 175b are surrounded by the first and second U-shaped source electrodes 173a and 173b, respectively. A passivation layer 180p including, for example, silicon nitride or silicon oxide, is formed on the data lines 171a and 171b including the source electrodes 173a and 173b, the drain electrodes 175a and 175b, and the exposed portions of the semiconductors 154a and 154b. A barrier rib 360 is formed on the passivation layer 180p. The barrier rib 360 includes a first barrier rib portion 3611 formed along the gate line 121, and second barrier rib portions 3631 formed along the data lines 171a and 171b. The barrier rib 360 overlaps the first and second source electrodes 173a and 173b connected to the data lines 171a and 171b, but does not overlap the wide end portions 175a2 and 175b2 of the first and second drain electrodes 175a and 175b. The region surrounded by the barrier rib 360 is roughly or substantially rectangular-shaped, and is filled with a material for a color filter 230. An overcoat 180q is formed on the color filter 230 filled in the rectangular-shaped region. A plurality of contact holes 185a and 185b are formed at the passivation layer 180p, the color filter 230, and the overcoat 180q and expose the first and the second drain electrodes 175a and 175b. The color filter 230 may be formed with a negative photosensitive organic material. A plurality of pixel electrodes 191 are formed on the overcoat 180q. Each pixel electrode 191 contacts the end portions 175a2 and 175b2 of the first and second drain electrodes 175a and 175b through the contact holes 185a and 185b formed at the overcoat 180q, the color filter 230, and the passivation layer 180p. The contact holes 185a and 185b are formed with the same shape as the end portions 175a2 and 175b2 of the first and second drain electrodes 175a and 175b, and have a smaller size than that of the end portions 175a2 and 175b2 of the first and second drain electrodes 175a and 175b. The external boundaries of the wide end portions 175a2 and 175b2 of the first and second drain electrodes 175a and 175b are formed with a plurality of sides. The line widths t1 and t2 of the end portions 175a2 and 175b2 of the first and second drain electrodes 175a and 175b overlapped with the color filter 230 at the center of the respective sides thereof, being the external boundaries, may differ from each other, and may be about 3 µm or less. If the line widths t1 and t2 of the end portions 175a2 and 175b2 exceed about 3 µm, the contact holes 185a and 185b formed at the color filter 230 are reduced in size so that it becomes difficult for the pixel electrode 191 to smoothly contact the first and second drain electrodes 175a and 175b. The line widths t1 and t2 of the color filter 230 overlapped between the center of the respective sides may differ from each other, but the difference between the lines widths t1 and t2 is about 0.5 µm or less according to an exemplary embodiment. If such a difference exceeds about 0.5 µm, the contact holes 185a and 185b formed at the color filter 230 become asymmetrical in shape to each other so that it becomes difficult for the pixel electrode 191 to smoothly contact the first and second drain electrodes 175a and 175b.

Figure 14:
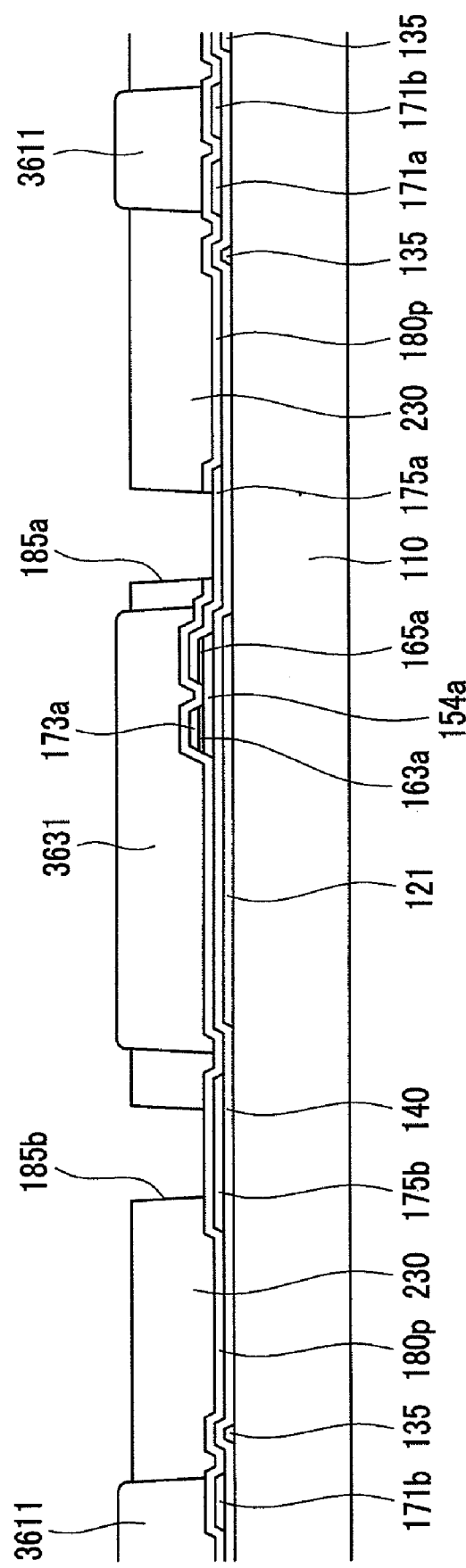
FIG. 14 is a cross-sectional view illustrating a method of manufacturing the thin film transistor array panel shown in FIG. 13.

FIG. 14 is a cross-sectional view illustrating a method of manufacturing the thin film transistor array panel shown in FIG. 13.

As shown in FIG. 14, gate lines 121 including gate electrodes 124a and 124b, and storage electrode lines, including the stem portions 131 and storage electrodes 135 are formed on an insulation substrate 110. Thereafter, a gate insulating layer 140 is formed on the gate lines 121 and the storage electrode lines, and an ohmic contact pattern and semiconductors 154a and 154b are formed on the gate insulating layer 140. A conductive layer is deposited on the ohmic contact pattern and patterned to thereby form data lines 171a and 171b with source electrodes 173a and 173b, and drain electrodes 175a and 175b. The ohmic contact pattern is etched by using the source electrodes 173a and 173b and the drain electrodes 175a and 175b as a light blocking film to thereby form ohmic contacts 163a, 163b, 165a, and 165b. A passivation layer 180p is formed on the data lines 171a and 171b including the source electrodes 173a and 173b and the drain electrodes 175a and 175b. A photoresist diffused with black pigment is applied onto the passivation layer 180p, and is exposed to light and developed, thereby forming a barrier rib 360 and demarcating ink storage regions. Color filters 230 are formed within the pixels defined by the barrier rib 360. The color filters 230 may be formed by way of the inkjet printing process, which is conducted by dripping a color filter solution while moving the inkjet head, and drying the color filter solution. The color filter 230 is formed with a negative photosensitive organic material.

The color filter 230 is exposed to light from the backside of the substrate 110 and developed by using the first and second drain electrodes 175a and 175b as a light blocking film. As the color filter 230 is formed with a negative photosensitive organic material, only the non-exposed color filter portions on the first and second drain electrodes 175a and 175b are developed so that contact holes 185a and 185b are formed at the color filter 230 on the first and second drain electrodes 175a and 175b so as to expose the passivation layer 180p.

Thereafter, as shown in FIG. 12 and FIG. 13, an overcoat 180q is formed on the color filter 230 with a photosensitive organic material, and flattened. The overcoat 180q may be formed through inkjet printing, as with the color filter 230. The portions of the overcoat 180q and the passivation layer 180p corresponding to the contact holes 185a and 185b are dry-etched to thereby expose the first and second drain electrodes 175a and 175b. Pixel electrodes 191 are formed on the overcoat 180q such that they are each connected to the first and second drain electrodes 175a and 175b through the contact holes 185a and 185b.

Conventionally, if the color filters are formed at the thin film transistor array panel, it is difficult to form minute patterns as the color filter formation is performed with a negative photosensitive organic material. Further, with the usage of a light exposing device with poor resolution, diffraction occurs at the edge of the mask pattern so that the size of the contact holes reaches about 20 µm or more. Furthermore, as the diffraction occurs at the upper, lower, left, and right edges of the contact holes 185a and 185b, the optical interference due to the diffraction occurs on a large scale so that the contact holes may be clogged.

However, with the present exemplary embodiment, the color filters 230 are formed with a negative photosensitive material and exposed to light from the backside thereof by using the first and second drain electrodes 175a and 175b as a light blocking film, thereby reducing the size of the contact holes 185a and 185b.

In addition, conventionally, the size of the first and second drain electrodes 175a and 175b is about 30 µm or more considering the alignment margin between the contact holes 185a and 185b and the first and second drain electrodes 175a and 175b, and the leakage of light, so that the aperture ratio is reduced. However, with the present exemplary embodiment, when the color filter 230 is exposed to light from the backside thereof by using the first and second drain electrodes 175a and 175b as a light blocking film, the alignment error and the leakage of light do not occur, and it is not needed to enlarge the size of the first and second drain electrodes 175a and 175b, thereby enhancing the aperture ratio.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A thin film transistor array panel comprising:
   a substrate;
   gate lines formed on the substrate and extending in a first direction;
   data lines formed on the substrate and extending in a second direction, wherein the data lines cross and are insulated from the gate lines;
   thin film transistors, each including a control terminal, an input terminal, and an output terminal, the control and input terminals of the thin film transistor being connected to the gate and data lines, respectively;
   a barrier rib formed on the gate lines, the data lines, and the thin film transistors;
   color filters filling regions demarcated by the barrier rib; and
   pixel electrodes formed on the color filters,
   wherein the output terminal of the thin film transistor has an opening, a portion of the barrier rib formed on the output terminal has an output opening, and the barrier rib output terminal portion has the same pattern as the output terminal.

2. The thin film transistor array panel of claim 1, wherein a pixel electrode partially contacts a side of the opening of the output terminal and the barrier rib output terminal portion.

3. The thin film transistor array panel of claim 2, further comprising a passivation layer formed between the data lines and the barrier rib and between the data lines and the color filters, and an overcoat formed between the barrier rib and the color filters and between the barrier rib and the pixel electrode, wherein the passivation layer and the overcoat include contact holes, and the pixel electrode contacts the output terminal of the thin film transistor through the contact holes.

4. The thin film transistor array panel of claim 3, wherein the pixel electrode contacts the substrate through the output opening of the output terminal.

5. The thin film transistor array panel of claim 4, wherein the contact hole of the passivation layer has a smaller diameter than the contact hole of the overcoat, and the output opening of the barrier rib output terminal portion has a larger diameter than the contact hole of the passivation layer and a smaller diameter than the contact hole of the overcoat.

6. The thin film transistor array panel of claim 5, wherein the barrier rib output terminal portion has a line width of about 2 µm to about 4 µm.

7. The thin film transistor array panel of claim 4, wherein a light blocking member is formed on the overcoat corresponding to the barrier rib.

8. The thin film transistor array panel of claim 7, wherein the barrier rib is formed with a positive photosensitive organic material.

9. The thin film transistor array panel of claim 1, wherein a gate line opening is formed at an end portion of the gate line to expose the substrate, and a data line opening is formed at an end portion of the data line to expose the substrate.

10. The thin film transistor array panel of claim 9, further comprising a gate line barrier rib portion formed on the end portion of the gate line with the same pattern as the end portion of the gate line having the gate line opening, and a data line barrier rib portion formed on the end portion of the data line with the same pattern as the end portion of the data line having the data line opening.

11. The thin film transistor array panel of claim 1, wherein the barrier rib includes portions having the same pattern as at least one of the gate lines, the data lines, and the thin film transistors.

12. A method of manufacturing a thin film transistor array panel, comprising the steps of:
   forming gate lines extending in a first direction on a substrate;
   forming a gate insulating layer on the gate lines;
   forming semiconductors on the gate insulating layer;
   forming data lines extending in a second direction crossing the first direction, and forming drain electrodes having openings;
   sequentially forming a passivation layer and a positive photosensitive organic layer on the data lines and the drain electrodes;
   exposing the positive photosensitive organic layer to light from a backside of the substrate by using the gate lines, the data lines, and the drain electrodes as a light blocking film to thereby form a barrier rib; and forming color filters within regions demarcated by the barrier rib,
wherein the barrier rib comprises a drain electrode barrier rib portion formed on a drain electrode having an opening.

13. The method of claim 12, further comprising:
forming an overcoat on the color filters and the barrier rib with a photosensitive material;
exposing a portion of the overcoat surrounded by the drain electrode barrier rib portion to light from a front side of the substrate, and developing the light-exposed portion to thereby form a contact hole;
removing a portion of the passivation layer and the gate insulating layer corresponding to the contact hole to thereby expose the drain electrode having the opening; and
forming a pixel electrode such that the pixel electrode is connected to the drain electrode through the contact hole.

14. The method of claim 13, further comprising forming a light blocking member on the barrier rib.

15. A thin film transistor array panel comprising:
a substrate;
gate lines formed on the substrate extending in a first direction;
data lines formed on the substrate, wherein the data lines extend in a second direction crossing the gate lines and are insulated from the gate lines;
thin film transistors, each including a control terminal, an input terminal, and an output terminal with an opening, the control and input terminals of the thin film transistor being connected to the gate and data lines;
a barrier rib formed on the data lines;
color filters filling regions demarcated by the barrier rib and having contact holes exposing the output terminals of the thin film transistors; and
pixel electrodes formed on the color filters such that the pixel electrodes contact the output terminals through the contact holes,
wherein the barrier rib is absent from the output terminals.

16. The thin film transistor array panel of claim 15, wherein the contact holes are similar in shape to the output terminals.

17. The thin film transistor array panel of claim 16, wherein an output terminal of a thin film transistor is polygonal-shaped with a plurality of sides, and a portion of the output terminal overlapping the color filter at a center of the respective sides thereof has a line width of about 3 µm or less.

18. The thin film transistor array panel of claim 17, wherein the sides of the output terminal overlapping the color filter differ in line width from each other by about 0.5 µm or less.

19. A method of manufacturing a thin film transistor array panel, comprising:
forming gate lines on a substrate extending in a first direction;
forming a gate insulating layer on the gate lines;
forming semiconductors on the gate insulating layer;
forming drain electrodes and data lines extending in a second direction crossing the first direction;
forming a passivation layer on the data lines and the drain electrodes;
forming a barrier rib on the passivation layer corresponding to the gate and data lines;
forming color filters within regions demarcated by the barrier rib; and
exposing the color filters to light from a backside of the substrate by using the drain electrodes as a light blocking film, to form openings at the color filters such that the passivation layer is exposed through the openings.

20. The method of claim 19, further comprising:
forming an overcoat on the color filters;
patterning the overcoat with the same pattern as the contact holes; and
forming pixel electrodes on the overcoat, wherein the pixel electrodes are connected to the drain electrodes through the contact holes.

* * * * *